United States Patent [19]

Roosild et al.

[11] 3,902,066

[45] Aug. 26, 1975

[54] SCHOTTKY BARRIER INFRARED DETECTOR ARRAYS WITH CHARGE COUPLED DEVICE READOUT

[75] Inventors: Sven A. Roosild, Framingham; Freeman D. Shepherd, Jr., Chelmsford; Andrew C. Yang, Concord; Walter M. Shedd, Acton, all of Mass.

[73] Assignee: The United States of America as represented by the Secretary of the Air Force, Washington, D.C.

[22] Filed: Mar. 18, 1974

[21] Appl. No.: 452,039

[52] U.S. Cl. .................. 250/332; 250/330; 250/338

[51] Int. Cl.[2] .......................................... H01J 31/49

[58] Field of Search...................... 250/330, 332, 338

[56] References Cited

UNITED STATES PATENTS

| | | | |
|---|---|---|---|
| 3,660,663 | 5/1972 | Guildford | 250/332 |
| 3,808,435 | 4/1974 | Bate et al. | 250/332 |
| 3,833,812 | 9/1974 | Reilly et al. | 250/330 |

*Primary Examiner*—Archie R. Borchelt
*Attorney, Agent, or Firm*—Joseph E. Rusz; Henry S. Miller, Jr.

[57] ABSTRACT

Schottky barrier detector arrays for detecting the infrared portion of the spectrum connected through enhancement mode field effect transistors to a charge coupled device for read out. The system utilizes a voltage to charge conversion to provide an infrared camera device vidicon.

4 Claims, 5 Drawing Figures

SCHOTTKY BARRIER INFRARED DETECTOR ARRAYS WITH CHARGE COUPLED DEVICE READOUT

BACKGROUND OF THE INVENTION

This invention relates generally to infrared detectors and more specifically to a Schottky barrier infrared detector array having a charge transfer device CTD readout system.

Thus far, camera type imaging devices have been limited to the visible and near infrared part of the spectrum. The camera tube advantage of enhanced sensitivity from frame time integration is limited in the 2 to 5$\mu$ region because of a combination of low object contrast and the inability to produce a uniform sensor surface, or retina.

Current infrared detector systems are manufactured at great expense while having a relatively short service period. Utilizing a rotating mirror in combination with silicon or germanium [with critical impurity balancing] or mercury cadmium telluride and lead tin telluride compounds, the prior art uses the well known and accepted principles of photo conductivity to detect infrared images. As well as being expensive and having a short operational lifetime, the prior art sensing devices suffer from a lack of uniformity which prevents detector array extension to two dimensions.

A total silicon system eliminates moving parts, exotic compound materials and greatly simplifies cooling requirements. Therefore, this invention seeks to overcome the disadvantages of the prior art and provides a new and improved infrared sensing array that utilizes the concept of total silicon structure.

SUMMARY OF THE INVENTION

Utilizing a high uniformity retina array, which senses by internal photoemissions, combining this with a charge transfer device readout system it is now possible to extend camera tube operation to regions of the spectrum never before practical.

The device of the invention uses a built up array of unit cells which are ultimately sequentially sensed, amplified and fed to a suitable output such as, for example, a cathode ray. The unit cells consist of a sensing electrode which may be a Schottky barrier diode. The diode is backed biased and isolated, and exposed to infrared photon flux. The remaining diode voltage is then read, and converted to a proportional charge. Subsequently, the charge is transferred to a charged coupled readout where it is manipulated in the appropriate manner to be compatible with the type of display selected. The entire operation is controlled by a pair of clocks that cause the diode to be charged at the appropriate time and likewise cause the transfer of the charge from the diode to the charge coupled devices.

Utilizing the same system, it is likewise possible to detect with different and various wavelength cutoff detectors by merely substituting Schottky barrier detector metals. Similarly, additional versatility is found in the system by utilizing an opposite conductivity type silicon under the Schottky barrier to obtain different barrier heights.

It is therefore an object of the invention to provide a new class of improved infrared radiation detectors.

It is another object of the invention to provide a new and improved infrared radiation detector that may be used in camera type imaging devices.

It is a further object of the invention to provide a new and improved infrared radiation detector that utilizes total silicon technology.

It is still another object of the invention to provide a new and improved infrared radiation imaging device that has no moving parts.

It is still a further object of the invention to provide a new and improved infrared radiation detector that provides a more uniform detecting surface than any hitherto known.

It is another object of the invention to provide a new and improved infrared detector that senses by internal photoemission, combined with storage and CCD readout.

It is another object of the invention to provide a new and improved infrared radiation detector that is more reliable and has a longer service expectancy than any hitherto known.

It is another object of the invention to provide an infrared radiation detector that is readily adaptable for use with conventional camera type imaging systems.

It is another object of the invention to provide an infrared detector system of a new and improved variety that includes multicolor detection.

It is another object of the invention to provide a new and improved infrared detection system that is capable of converting incident radiation to voltage.

It is another object of the invention to provide a new and improved infrared detection system that is capable of converting a voltage to an equivalent charge.

It is another object of the invention to provide a new and improved infrared detector that eliminates the need for rare and expensive exotic compound materials.

These and other advantages, features and objects of the invention will become more apparent from the following description taken in connection with the illustrative embodiments in the accompanying drawings.

DESCRIPTION OF THE PREFERRED EMBODIMENTS

Figure 1:
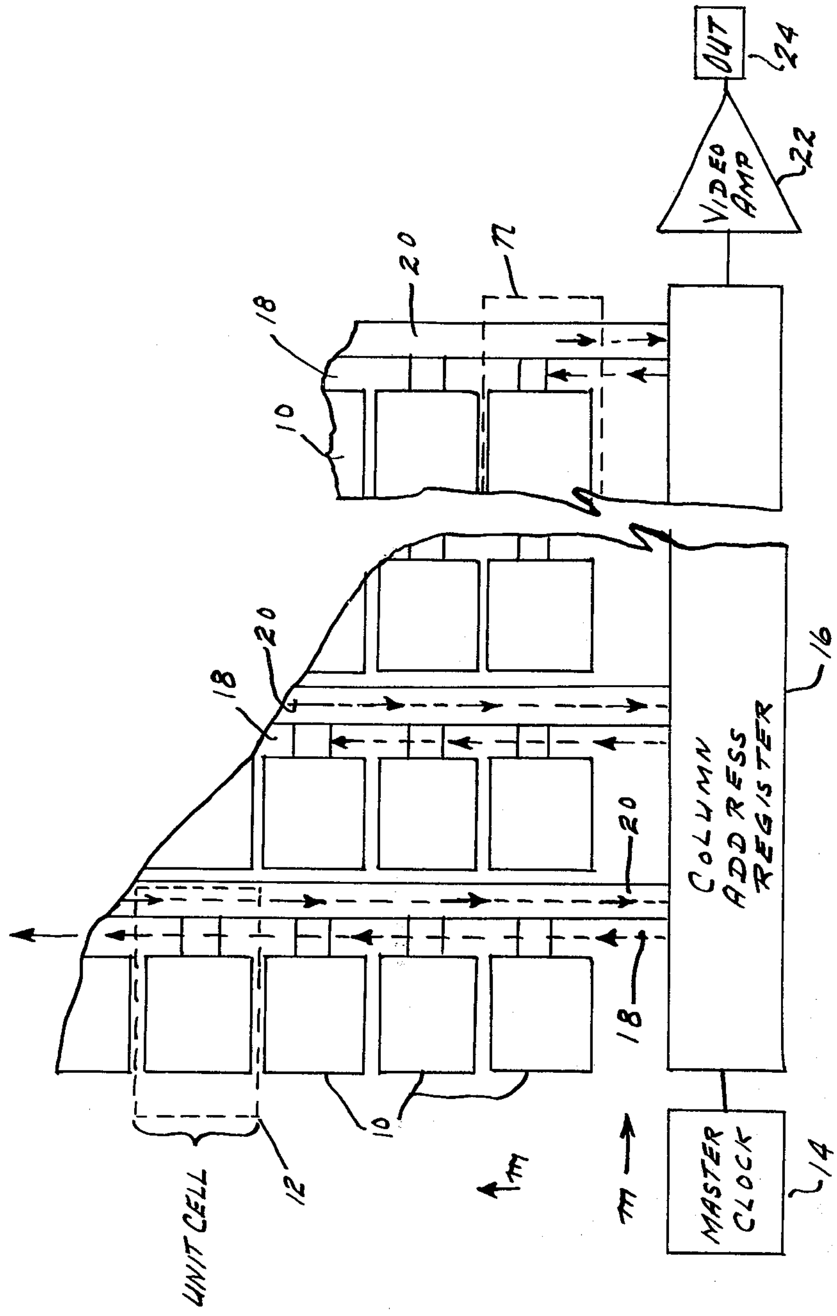
FIG. 1 is a schematic representation of a portion of an infrared detector array system.

Referring now to FIG. 1, there is shown a partial array of infrared sensors represented by the rectangular blocks 10. The sensors of the invention are conventional Schottky barrier diodes, although alternate forms of this detector may be utilized as will be shown hereinafter. The individual detector, its transfer and converting components are shown at 12 and referred to as a "unit cell". The individual unit cells in the figure are arranged in what will be described as an "mxp" array, with the unit cell in the lower right being the "$n^{th}$" unit cell.

The unit cells are controlled by the master clock 14 which, through the column address register 16 causes the individual unit cells to operate in a preferred sequential manner.

Arrows 18 illustrate input to the unit cell, while arrows 20 illustrate output from the unit cell. Input consists of a signal from the charge clock, in the column address register, thereby allowing a voltage to build in the Schottky barrier diode. After the diode is charged and exposed to radiation for a predetermined time, a transfer clock allows the remaining voltage to transfer from the diode to the charge coupled readout array, and thence through the column address register to the video amplifier 22 to a suitable output 24.

The size and shape of the array, including the spacing and number of unit cells would depend upon the use of the detector, whether it be a camera type imaging system or other related use.

Figures 2, 3:
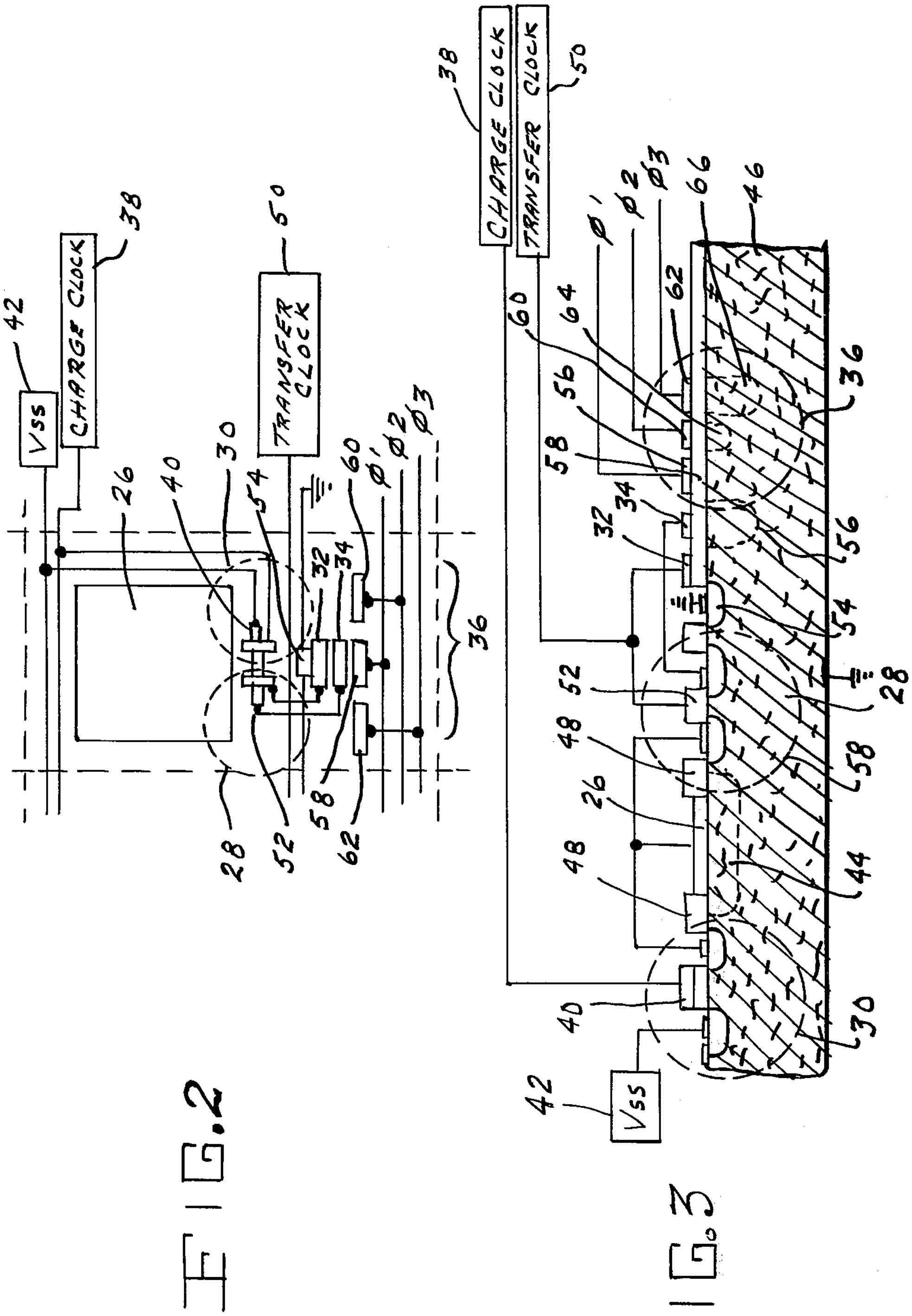
FIG. 2 is a diagrammetric representation of a unit cell in the detector array.
FIG. 3 is a diagrammetric representation of a unit cell in the detector array.

FIGS. 2 and 3 are different views of the same unit cell and will be discussed together. The unit cell is composed of a sensing electrode 26 (Schottky barrier diode) and two enhancement mode field effect transistors (MOS) 28 and 30. In conjunction with this is a transfer gate 32, a charge conversion element 34 and a charge coupled device (CCD) assembly shown generally at 36.

The operation of the unit cell will be described with the clock table to provide a clear and adequate understanding of the array subsystem. At time t = o the changing clock 38 allows a voltage pulse to reach the gate 40 of the transister 30 sufficient to turn the transistor on. This allows the supply potential 42 to back bias the Schottky diode 26. The effect of the back bias is to create a depletion region 44 in the silicon 46 below the diode.

For one frame time, incoming infrared photon flux striking of the Schottky barrier metal 48, will discharge the diode to a voltage related to the flux. The effect is caused by the injection of electrons or holes into the adjoining depletion region in the silicon structure. This transfer neutralizes part of the space charge and thereby effectively reduces the potential of the Schottky diode.

At time $t = n$ where = is the frame time, the transfer clock will pulse the gate 52 of the field effect transistor 28. The pulse will be sufficient to turn the transistor on. At this time, the remaining potential of the Schottky diode appears now on the metal electrode 34. Simultaneously with the pulse on transistor 28 the transfer gate 32 is opened to allow charge to flow from a grounded diffused region 54 into the potential well 56 beneath electrode 34. The amount of transferred charge will be proportioned to the transferred Schottky electrical potential.

At time $t = n+1$ the charging clock 38 reactivates and the charge under the electrode 34 is transferred to the nearest CCD element 38. The charge is now transferred through the CCD elements 58, 60 and 62 in the manner characteristic to CCD and down the columns 20 and into the video amplifier as shown in FIG. 1.

Clock Table for
m×m array where m×p = n = frame time

| t | charge clock | transfer clock | $\phi_1$ | $\phi_2$ | $\phi_3$ |
|---|---|---|---|---|---|
| O | V | O | V | O | ½V |
| 1 | O | O | ½V | V | O |
| 2 | O | O | O | ½V | V |
| 3 | O | O | V | O | ½V |

-Continued

Clock Table for
m×m array where m×p = n = frame time

| | | | | | |
|---|---|---|---|---|---|
| m | O | O | V | O | ½V |
| m + 1 | O | O | O | O | O |
| n − 1 | O | O | O | O | O |
| n + 1 | O | V | O | O | O |
| n | V | O | V | O | ½V |

TABLE 1

It will be understood that the particular nature and makeup of the CCD, for example 2 phase 3 phase or 4 phase, is unimportant to the inventive concept of the device.

The charge-coupled device is a class of semiconductor devices which are known in the information-handling art. The information is represented and stored in potential wells 64,66 created at the surface of the semiconductor. The charge is then moved from one position to another by proper manipulation of the potential wells. The nature of the CCD is detailed in the Yearbook of Science and Technology 1971, by McGraw Hill Publishing Company.

Figure 4:
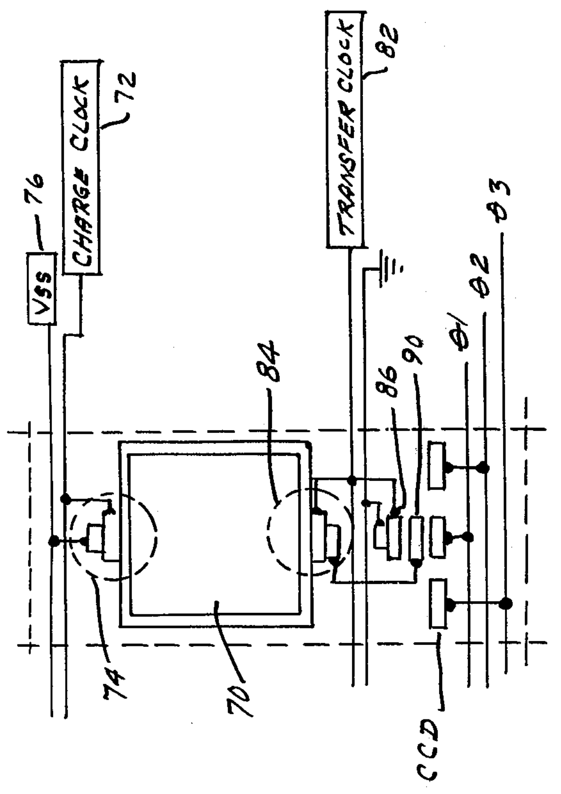
FIG. 4 is a diagrammetric representation of an alternative unit cell in the detector array.
Figure 5:
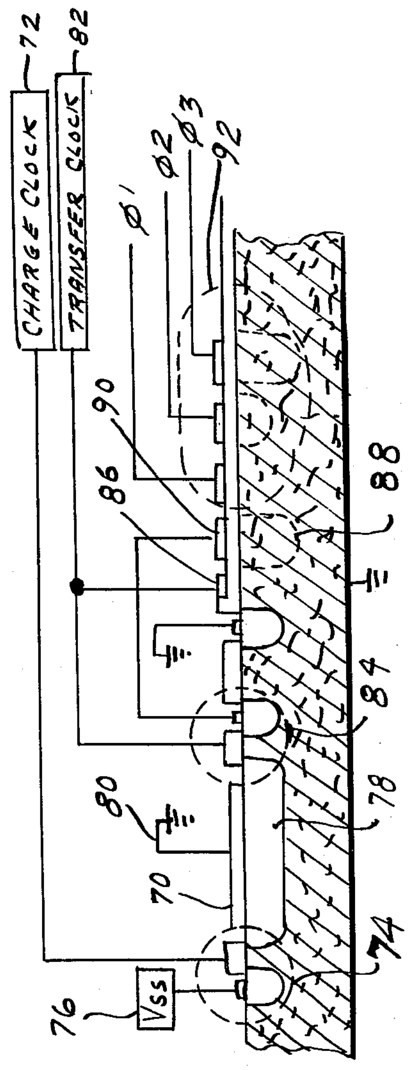
FIG. 5 is a diagrammetric representation of an alternative unit cell in the detector array.

Concerning the alternative embodiment of the invention shown in FIGS. 4 and 5, the Schottky barrier diode is shown at 78. Charge clock 72 turns on the field effect transistor 74 allowing the potential 74 to be applied to silicon tub 78. The tub is of a conductivity type opposite that of the Schottky barrier diode. The utilization of different, opposite conductivity type materials under the Schottky barrier allows varying barrier heights and hence an ability to detect with different wavelength cutoffs depending upon the materials used.

The sensing element is grounded at 80 and at the appropriate time the transfer clock 82 turns on the field effect transistor 84 causing the remaining potential to pass out of the detector through the transfer gate 89 into the diffused region 88 beneath the electrode 90. The potential now converted to a proportional charge is passed to the CCD elements 92 and out of the system as explained in FIG. 1. The clock table applied to FIGS. 2 and 3 would be appropriate for FIGS. 4 and 5.

It has been shown then that by utilizing a charge coupled device in conjunction with a Schottky barrier diode and appropriate timing that it is now possible to provide an inexpensive high uniformity radiation sensing device that will operate into longer wavelengths than the normal intrinsic silicon cutoff wavelength.

Although the invention has been described with reference to a particular embodiment, it will be understood to those skilled in the art that the invention is capable of a variety of alternative embodiments within the spirit and scope of the appended claims.

What is claimed is:

1. An infrared detector array comprising: a plurality of infrared radiation sensing means arranged in an orderly two dimensional pattern; electrical means connecting each of the sensing means; register means connected to the sensing means through the said electrical means; clock means connected to the register means whereby each sensing means is controlled in time and sequence; an amplifier connected to the output of the register means, and an output display means connected to the amplifier means for providing an indication of sensed infrared radiation.

2. An infrared detector array according to claim 1 wherein the sensing means comprises; a base; radiation sensitive means on the base; means for applying a voltage to said sensitive means; means for removing the voltage from said sensitive means; means for converting the voltage removed to a charge; a charge coupled device assembly connected to the said converting means for transfering the charge away from the sensing means.

3. An infrared detector array according to claim 2 wherein: the radiation sensitive means is Schottky barrier diode.

4. An infrared detector array according to claim 2 wherein: the means for applying voltage is a field effect transistor.

* * * * *